US011780566B2

(12) United States Patent
Linde et al.

(10) Patent No.: US 11,780,566 B2
(45) Date of Patent: Oct. 10, 2023

(54) FLOW BODY FOR AN AIRCRAFT WITH A SELECTIVELY ACTIVATABLE SHOCK BUMP

(71) Applicants: Airbus Operations GmbH, Hamburg (DE); Airbus Defence and Space GmbH, Taufkirchen (DE)

(72) Inventors: Peter Linde, Hamburg (DE); Wolfgang Machunze, Taufkirchen (DE)

(73) Assignees: Airbus Operations GmbH; Airbus Defence and Space GmbH

( * ) Notice: Subject to any disclaimer, the term of this patent is extended or adjusted under 35 U.S.C. 154(b) by 0 days.

(21) Appl. No.: 17/737,550

(22) Filed: May 5, 2022

(65) Prior Publication Data

US 2022/0258853 A1    Aug. 18, 2022

Related U.S. Application Data

(63) Continuation of application No. PCT/EP2020/080917, filed on Nov. 4, 2020.

(30) Foreign Application Priority Data

Nov. 6, 2019  (DE) .......................... 102019129903.9

(51) Int. Cl.
*B64C 23/04*  (2006.01)
*B29C 70/54*  (2006.01)
(Continued)

(52) U.S. Cl.
CPC ............ *B64C 23/04* (2013.01); *B29C 70/543* (2013.01); *B64C 3/20* (2013.01); *B29L 2031/3076* (2013.01); *B64C 2039/105* (2013.01)

(58) Field of Classification Search
CPC .................................. B64C 23/04; B64C 3/20
See application file for complete search history.

(56) References Cited

U.S. PATENT DOCUMENTS 3,578,264 A * 5/1971 Kuethe ..................... F28F 1/32
                                                              181/220
5,058,837 A * 10/1991 Wheeler ................ B64C 23/06
                                                              244/200.1
(Continued)

FOREIGN PATENT DOCUMENTS

DE        4446031 A1      6/1996
DE       19858872 A1      6/2000
(Continued)

OTHER PUBLICATIONS

German Search Report for Application No. 10 2019 129 903.9 dated Sep. 2, 2020, 2 pages. [See p. 2, categorizing the cited references].
(Continued)

*Primary Examiner* — Michael H Wang
(74) *Attorney, Agent, or Firm* — Lerner David LLP

(57) ABSTRACT

A flow body for an aircraft includes a skin having a first flow surface, having a flow influencing section with at least one first layer, at least one separator layer, at least one third layer, and at least one base layer. The first layer includes lithiated carbon fibers embedded into a matrix to form a negative electrode. The third layer includes carbon fibers with an electrode active material coating to form a positive electrode. The separator layer includes a non-conductive material for electrically isolating the first layer and the third layer from each other. The flow influencing section is configured for selectively raising a region of the arrangement of first layer, separator layer and third layer from the base layer upon application of a voltage between the first and third layers to form a bump on the flow body.

15 Claims, 4 Drawing Sheets

(51) Int. Cl.
*B64C 3/20* (2006.01)
*B29L 31/30* (2006.01)
*B64C 39/10* (2006.01)

(56) References Cited

U.S. PATENT DOCUMENTS

| | | | | |
|---|---|---|---|---|
| 5,433,404 | A * | 7/1995 | Ashill | B64C 3/48 |
| | | | | 244/200 |
| 7,380,756 | B1 | 6/2008 | Enloe et al. | |
| 7,598,651 | B2 | 10/2009 | Kornbluh et al. | |
| 2005/0056731 | A1 * | 3/2005 | Hamilton | B64C 3/46 |
| | | | | 244/219 |
| 2006/0060720 | A1 * | 3/2006 | Bogue | B64C 39/12 |
| | | | | 244/200 |
| 2006/0214065 | A1 | 9/2006 | Jaenker | |
| 2006/0267376 | A1 | 11/2006 | McKnight et al. | |
| 2008/0128027 | A1 * | 6/2008 | Hyde | B64C 21/10 |
| | | | | 137/13 |
| 2009/0084906 | A1 * | 4/2009 | Hassan | B64C 23/04 |
| | | | | 244/208 |
| 2010/0301171 | A1 * | 12/2010 | Wood | B64C 23/04 |
| | | | | 244/200 |
| 2015/0101325 | A1 * | 4/2015 | Beblo | F03G 7/065 |
| | | | | 60/528 |
| 2021/0253226 | A1 * | 8/2021 | Nagashiki | B64C 3/30 |

FOREIGN PATENT DOCUMENTS

| | | |
|---|---|---|
| DE | 102005052930 A1 | 5/2007 |
| GB | 2296696 A | 7/1996 |
| WO | 2004069651 A1 | 8/2004 |
| WO | 2005124918 A2 | 12/2005 |
| WO | 2008069948 A1 | 6/2008 |

OTHER PUBLICATIONS

International Search Report for Application No. PCT/EP2020/080917 dated Feb. 4, 2021, pp. 1-3.

\* cited by examiner

Prior art

FLOW BODY FOR AN AIRCRAFT WITH A SELECTIVELY ACTIVATABLE SHOCK BUMP

CROSS-REFERENCE TO RELATED APPLICATIONS

The present application is a is a continuation of International Application No. PCT/EP2020/080917 filed Nov. 4, 2020, published in German, which claims priority from German Application No. 102019129903.9 filed Nov. 6, 2019, the disclosures of which are incorporated herein by reference.

FIELD OF THE INVENTION

The invention relates to a flow body for an aircraft, a wing for an aircraft as well as an aircraft having a wing and/or such a flow body.

BACKGROUND OF THE INVENTION

For improved fuel economy and reduced emissions of commercial aircraft, providing a substantially laminar flow is a possible option. In some circumstances, the airflow over a wing may reach velocities that exceed 1 Ma in a region. This may lead to creating a region of turbulent flow downstream of a flow separation point. For reducing the effects of such a flow behavior, a dedicated shock bump may be provided on the surface. It causes a gradual reduction of the airflow velocity and, consequently, turbulent airflow may be avoided. However, shock bumps mounted in a permanent manner cannot be considered ideal, as they are useful mainly at off-design cruise velocities. For variable shock bumps, attempts have been considered with mechanical actuators. However, these are complex and difficult to install and to operate properly.

DE 198 58 872 A1 shows an aircraft wing with a spoiler provided on its upper side with a flexible planking and at least one actuator acting on the flexible planking for adaptive control of shock waves via a convex bulge of the flexible planking.

SUMMARY OF THE INVENTION

An aspect of the invention relates to a flow body, which comprises a selectively activatable bump or any other device that is simple to install and to operate to selectively reduce effects of partial flow separation.

A flow body for an aircraft is proposed, the flow body comprising an outer skin, which provides a first flow surface, wherein the skin comprises at least one flow influencing section on the first flow surface, the flow influencing section comprising at least one first layer comprising a first fiber composite material, at least one separator layer, at least one third layer comprising a third fiber composite material, and at least one base layer comprising a base fiber composite material, wherein the at least one first layer, the at least one separator layer and the at least one third layer are arranged upon the at least one base layer in an alternating order, wherein the at least one first layer comprises lithiated carbon fibers embedded into a matrix to form a negative electrode, wherein the at least one third layer comprises carbon fibers with an electrode active material coating to form a positive electrode, wherein the at least one separator layer comprises a non-conductive material for electrically isolating the at least one first layer and the at least one third layer from each other, and wherein the flow influencing section is configured for selectively raising at least a region of the arrangement of first layer, separator layer and third layer from the at least one base layer upon application of a voltage between the first and third layers to form a bump on the flow body.

The flow body may be any component that is attachable to an aircraft and that is subjected to an airflow during flight of the aircraft. This may for example be a wing, a vertical or horizontal tailplane, a part of a blended wing body, a fairing, a fuselage or any other component. Due to the specific design of the flow body, its interior setup is not particularly relevant. Thus, any suitable stiffening arrangement may be provided to maintain the shape of the flow body, which is surrounded by the outer skin that determines the outer shape of the flow body. The first flow surface, which is provided by the outer skin, may be arranged on a top side of the flow body, where a flow separation point may occur. It is clear that the flow body may preferably comprise a second flow surface, which is opposed arranged on the outer skin. For example, the first flow surface is a top surface, while the second surface is a bottom surface. This may also refer to a first surface being a starboard surface and a second surface being a backboard surface.

According to an aspect of the invention, the flow body comprises a flow influencing section on the first surface. The flow influencing section is responsible for selectively creating a bump for influencing the flow to reduce an impact of a potential separation effect. The selective creation includes an actuation of at least a part of the flow influencing section to raise from a neutral shape to a risen shape to form a bump on demand. This means, that a deactivation of the bump can be conducted on demand as well.

The flow influencing section is created by an arrangement of layers of a fiber composite material. As a basis for the flow influencing section, at least one base layer is provided. It may include one or several inner layers that are not directly exposed to the airflow. The at least one base layer remains in a permanent position and does not move in any direction when the bump is formed. It is thus a passive part.

An active part of the flow influencing section comprises the at least one first layer, the at least one separation layer and the at least one third layer. These are arranged upon the at least one base layer in an alternating order. This means, that directly on the base layer, a first layer is arranged. Consecutively, a separation layer is provided. On top of this, a third layer is provided. If desired, a further separation layer, a further third layer, a still further separation layer and a still further first layer, etc., are provided.

The first layer comprises carbon fibers, which are lithiated to form a negative electrode. The term "lithiated" is to be understood as enriched or covered by Lithium. A carbon fiber may be lithiated through electrodeposition of Lithium ions, for example by immersing the fiber into a non-aqueous electrolyte, connecting a positive pole of a direct current source with the fiber to form an anode and a negative pole to a Lithium containing electrode to form a cathode. Lithium ions will then move from the Lithium source and attach to the anode. The carbon fibers may be lithiated prior to their deposition or they may also be lithiated afterwards. The lithiation enables the carbon fibers to release Lithium ions.

It has been discovered that lithiated carbon fibers comprise piezoelectric properties. Consequently, if a lithiated fiber is subjected to a mechanical load due to a flexural deformation of the respective composite component, it will generate a certain electrical load, which can be measured against a reference potential. However, if an electrical load is applied to the respective lithiated fibers against a reference potential, they lead to a flexural deformation. As a lithiated carbon fiber is based on a common carbon fiber, it provides the required reinforcement.

The third layer acts as a positive electrode and is capable of receiving Lithium ions by an electrode active coating. Together, the first and third layer provide a type of piezo actuator. By its actuation, the flow influencing section extends. By fixating at least two edges of the flow influencing section that are opposed along the extension direction, it will form a bump upon actuation.

The separation layer is provided for electrically isolating consecutive layers, such that a short circuit can be avoided when applying the voltage. When the voltage is applied to the respective layers, Lithium ions will travel between the first and third layer. Thus, the separation layer also needs to be permeable for Lithium ions. The combination of the first layer, the third layer and the separation layer resemble a battery-like structure. The combination of a plurality of these structures parallel to each other lead to a piezoelectric actuation arrangement having a high maximum force. By providing a selective application of the voltage to only one pair of first and third layers or a group of layers, the achievable force may be simple to modulate.

By providing the above identified features to an arrangement of layers of a composite material, a simple and efficient way of selectively creating a bump on a composite part, i.e. the flow body, can be achieved. In this context it is clear that the respective first and third layers need to be able to be reliably released from the at least one base layer. In turn, the base layer comprises a base composite material, such as a common carbon fiber reinforced plastic material. The flow body is created by a laminate with several layers, which comprises fibers embedded into a matrix material, such as a heat curable resin or a thermoplastic material. The flow influencing section lies flushly in the remaining laminate structure.

In a preferred embodiment, the flow influencing section has a fixed position on the flow body and is configured to expand upon application of the voltage, such that it buckles away from the at least one base layer. The flow influencing section remains in its predetermined position all the time. This means, that it cannot move on the outer surface of the flow body. Consequently, it is faced with geometric constraints, that lead to a buckling motion of the flow influencing section if it is expanded. An expansion leads to an elongation of the flow influencing section at least in one direction. Due to its constraints, it cannot expand in a flush contact with the at least one base layer. For still fitting the greater length, it will buckle, bulge or curve away from the at least one base layer. Hence, an intermediate space between the flow influencing section and the at least one base layer is created upon application of the voltage.

In an advantageous embodiment, the separator layer comprises a glass fiber reinforced plastics material. Thus, the separate layer may be sufficiently permeable for the Lithium ions and may further contribute to the stiffness of the flow body. Still further, a manufacturing method does not necessarily need to be modified, since the glass fiber reinforced plastics material may be handled and processed in the same way as carbon fiber reinforced plastics material.

In another advantageous embodiment, which may be an addition or an alternative to the above, the separator layer comprises carbon fibers having an electrically isolating coating. Hence, the resulting flow body has the same stiffness as a common flow body with a carbon fiber reinforced plastics material.

According to a further advantageous embodiment, the electrode active material coating comprises $LiFePO_4$. The use of this substance may lead to a more robust material, compared to e.g. $LiCoO_2$.

In a preferred embodiment, at least two edges of the flow influencing section that are opposed along an extension direction, are fixated to the base layer. Thus, a geometric constraint for the flow influencing section is created. Upon expanding the flow influencing section, it needs to buckle or bulge away from the at least one base layer.

Advantageously, along the at least two edges, the first, separator and third layers are sewn or stitched to layers underneath before a curing process. This clearly limits the boundaries of the flow influencing section. In this manner, a morphing shock bump can be achieved, which may be flat during climb and descent and which is only activated when needed, in order to maximize the performance of the aircraft. It further allows to prevent an increase of the separated length of the flow influencing section by peeling effects. The intended shape of the bump is ensured by stitching the layers or plies down into the remaining laminate, e.g. by a stitching machine. A stitched line at the beginning and at the end of the flow influencing section ensures that no peeling will occur during the operation. This is possible in a process such as RTM, in which plies that only contain a binder, are laid down dry. They are then subject to resin transfer molding etc.

Still further, it is advantageous if the first, separator and third layers of the respective flow influencing section are separated from material layers underneath through a friction reducing coating or layer. Thus, a vertical local release of the flow influencing section during the expansion is possible. The friction reducing coating may exemplarily comprise polytetrafluoroethylene (PTFE) or similar.

According to a further advantageous embodiment, the at least one flow influencing section includes at least two flow influencing sections, which at least partially overlap and which are individually and selectively actuatable to morph the bump from a neutral state to a plurality of different shapes. With this setup, it is possible to achieve not only a morphing shock bump in terms of variable amplitude transverse to the skin, but also to obtain a variable or changing shape of the bump along its length. Different flow influencing sections may be individually controlled. By selectively activating one of the shock bumps or a plurality thereof, the shape of the shock bump can be chosen and activated as desired.

The invention further relates to an aircraft having at least one flow body according to the above description.

Preferably, the flow body is at least one of a group of flow bodies, the group comprising a wing, a vertical tailplane, a horizontal tailplane, at least a part of a blended wing body, a fuselage, and a fairing.

Advantageously, the aircraft further comprises a control system and a voltage source coupled with the control system, wherein the at least one first layer and the at least one third layer are selectively couplable with the voltage source through the control system. The control system is thus able to activate or deactivate the creating of a bump on demand or on detecting an event.

Furthermore, the aircraft advantageously comprises a velocity sensor, wherein the control system is coupled with the velocity sensor to selectively apply a voltage to the at least one first layer and the at least one third layer upon reaching or exceeding at least one threshold velocity. For example, the control system may be able to determine or estimate the creation of a supersonic flow velocity on the first surface upon receiving measured velocity values. If a threshold is exceeded, the bump can be created on demand. Furthermore, several threshold values may be predetermined, which lead to different strengths or shapes of the bump.

The invention also relates to a method for producing a flow body for an aircraft, comprising the steps of laying at least one base layer onto a surface of a molding tool, creating a flow influencing section on the at least one base layer by laying at least one first layer comprising a first fiber composite material onto the base layer, laying at least one separator layer onto the first layer, laying at least one third layer comprising a third fiber composite material onto the separator layer, and fixing the first layer, the separator layer and the third layer onto the base layer, impregnating the arrangement of layers with a matrix material, and curing or hardening and removing the flow body from the molding tool, wherein the at least one first layer comprises lithiated carbon fibers embedded into a matrix to form a negative electrode, wherein the at least one third layer comprises carbon fibers with an electrode active material coating to form a positive electrode, and wherein the at least one separator layer comprises a non-conductive material for electrically isolating the at least one first layer and the at least one third layer from each other.

As stated above, the fixing may be conducted by stitching or sewing.

BRIEF DESCRIPTION OF THE DRAWINGS

Other characteristics, advantages and potential applications of the present invention result from the following description of the exemplary embodiments illustrated in the figures. In this respect, all described and/or graphically illustrated characteristics also form the object of the invention individually and in arbitrary combination regardless of their composition in the individual claims or their references to other claims. Furthermore, identical or similar objects are identified by the same reference symbols in the figures.

DETAILED DESCRIPTION OF EXEMPLARY EMBODIMENTS

Figure 1:
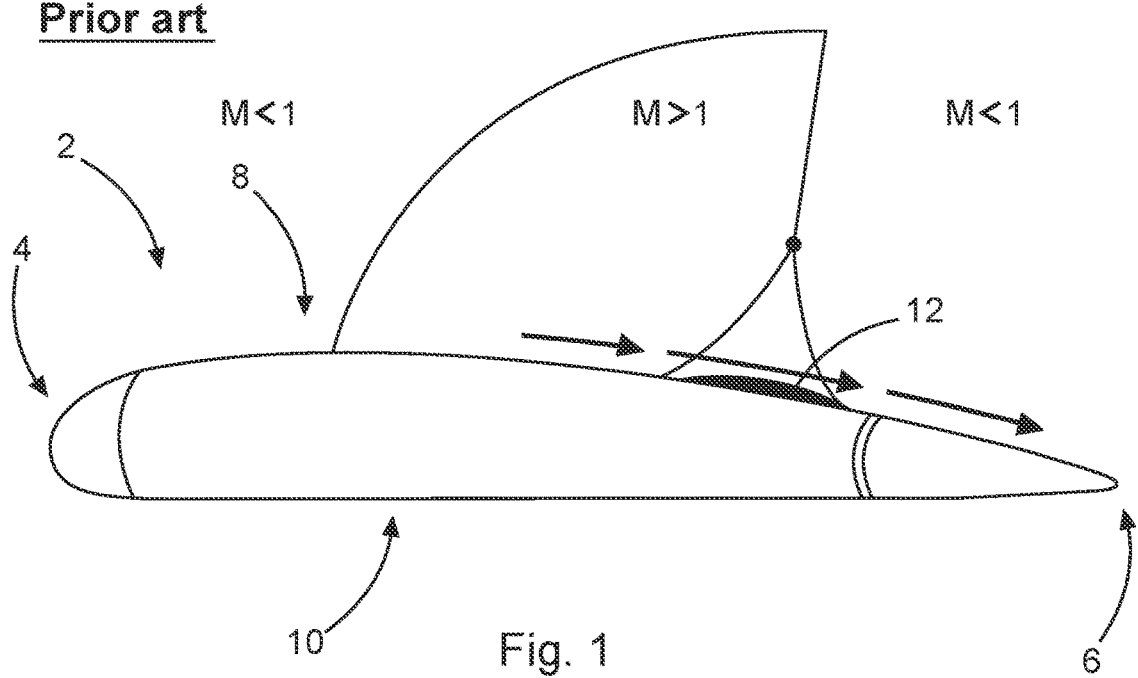
FIG. 1 shows a prior art wing with schematically indicated supersonic flow on the top surface.

FIG. 1 shows a schematic overview of a prior art wing 2 for an aircraft having a leading edge 4 and a trailing edge 6, between which a top surface 8 and a bottom surface 10 extend. In some circumstances, on a region of the top surface 8, a supersonic flow may occur, even when the wing 2 travels only with subsonic velocity. By using a bump 12 at a specific location, a separation of flow may be reduced or even completely prevented. However, the bump 12 maintains a fixed shape and position, which may lead to an increased drag compared to a wing without such a bump 12.

Figure 2:
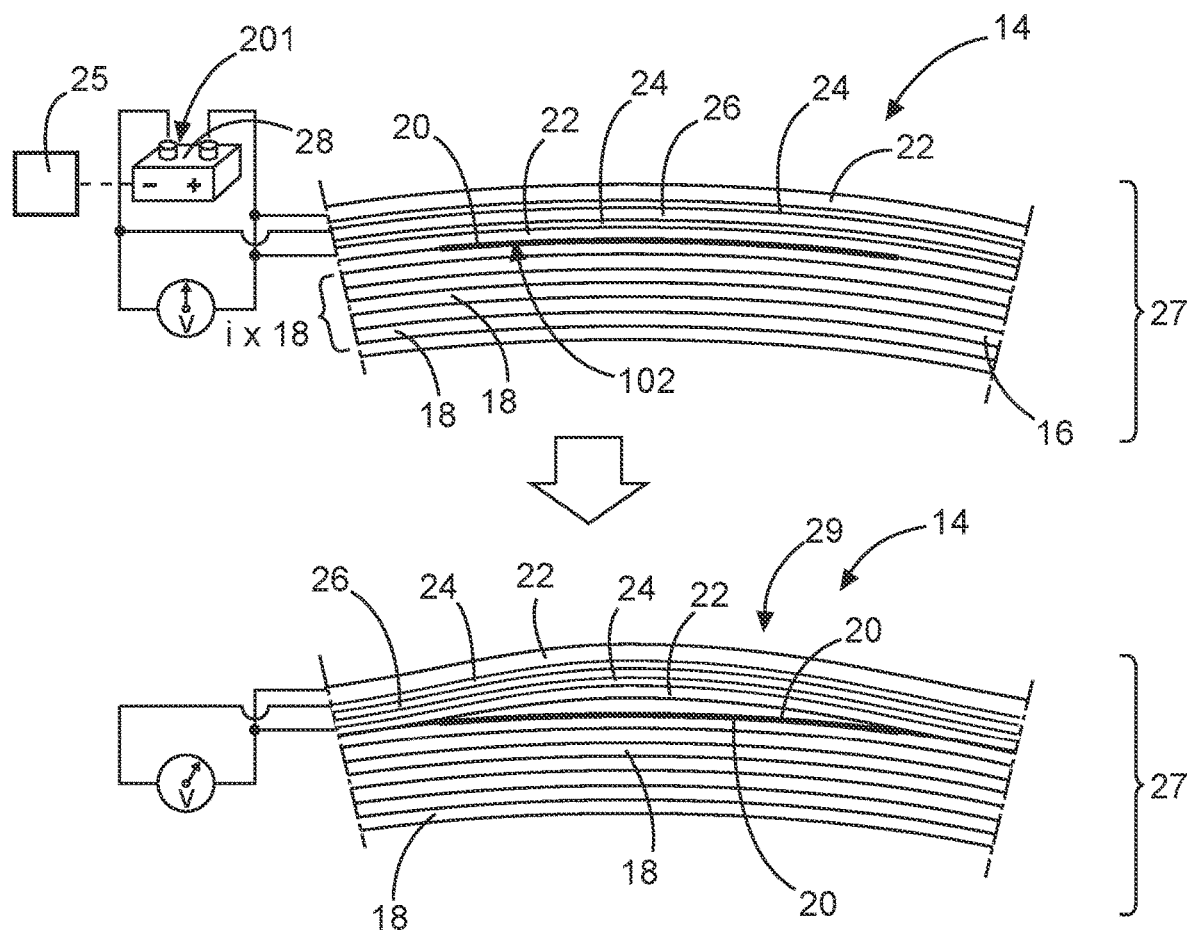
FIG. 2 a schematic overview of a flow influencing section is shown with and without a shock bump.

FIG. 2 shows an overview of a flow influencing section 14 on a flow body 16 according to an aspect of the invention. It comprises several base layers 18 made of a base fiber composite material. This may include carbon fibers embedded into a matrix material, such as heat curable resin or a thermoplastics material. On top of the top base layers 18, a friction reducing coating 20 is provided. This may include PTFE or another suitable material.

On top of the friction reducing layer 20, a first layer 22 of a first fiber reinforced composite material is placed. Said material comprises lithiated fibers embedded into a matrix material, which is preferably the same as in the base layers 18. By lithiating the carbon fibers, a negative electrode is formed that is capable of releasing Lithium ions.

On top of the first layer 22, a separator layer 24 is placed, which is a second layer in this arrangement. It is made of an electrically isolating material, which is permeable for Lithium ions. For example, it may be a fiber reinforced plastic material that comprises glass fibers embedded into a matrix material. As an alternative, it may also comprise carbon fibers having an electrically isolating coating. Again, the matrix material may be the same as in the first layer 20 and the base layers 18.

On top of the separator layer 24, a third layer 26 of a third fiber reinforced composite material is placed. This layer 26 exemplarily comprises carbon fibers coated with an electrode active material, such as $LiFePO_4$. It is capable of receiving Lithium ions and acts as a positive electrode.

Together, the first layer 22 and the third layer 26 comprise the same structural stability as the base layers 18, but together act as a piezo actuator upon application of a voltage from a voltage source 28. Due to the piezo effect, the first layer 22, the separator layer 24 and the third layer 26 expand and buckle away from the base layers 18, as shown in the lower part of FIG. 2. Resultantly, they create a bump 29. To increase this effect, further layers can be attached. For example, on top of the third layer 26, a further separator layer 24 can be arranged, which is followed by a first layer 22 and so on. With selected mechanical and electrical parameters the bump 29 may have substantially the same shape as the bump 12 shown in FIG. 1. The first layers 22, the separator layers 24, the third layers 26 and the base layers 18 together form an outer skin 27 of the respective flow body 16.

The voltage source 28 may be coupled with a control system 25, which is configured to connect the flow influencing section 14 to or disconnect it from the voltage source 28 to activate or deactivate the bump 29. Further, it may be configured to modulate the voltage applied to the flow influencing section in order to modulate the strength of the bump 29. The control system 25 may further be coupled with a velocity sensor of the aircraft to selectively apply a voltage to the flow influencing section 14 upon reaching or exceeding at least one threshold velocity to prevent an undesired flow separation. As stated before, several threshold values may be predetermined, which may lead to initiating different strengths or shapes of the bump.

FIG. 3 a shows a section of the flow influencing section 14 in another view. Here, exemplarily reinforcement fibers 30 extend along an x-axis. By application of the voltage they extend along the x-direction.

Figure 3A:
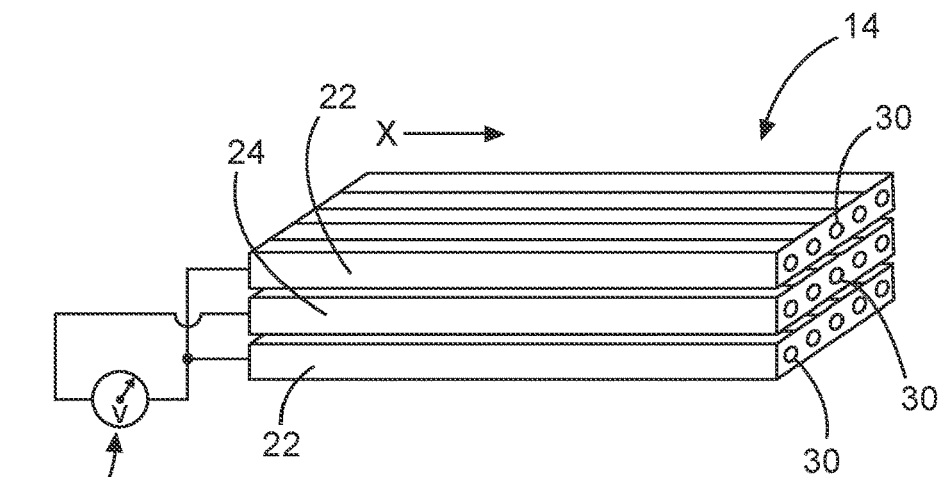
FIG. 3a shows the flow influencing section in another view.
Figure 3B:
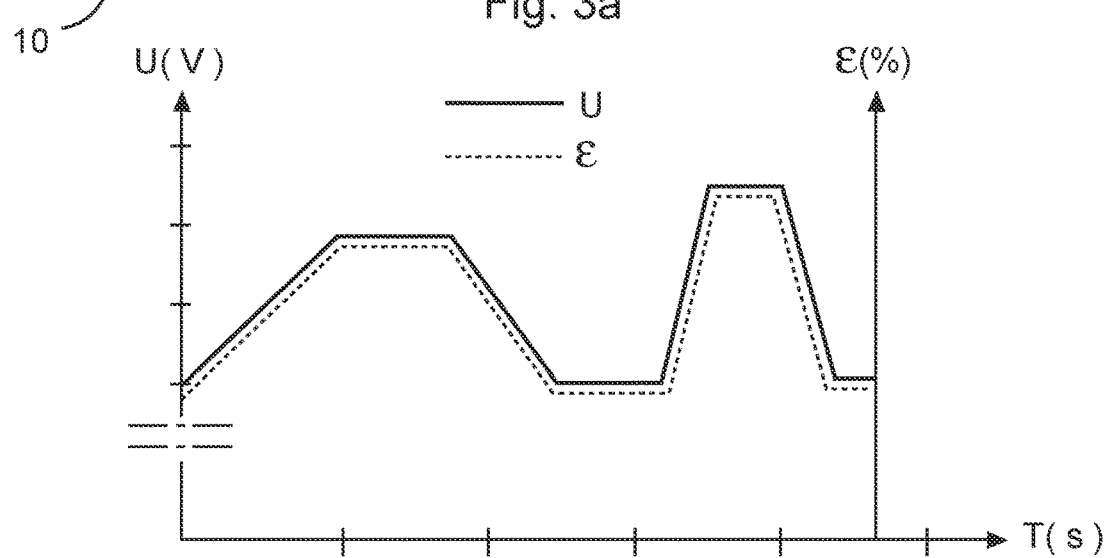
FIG. 3b shows the relationship between voltage and elongation.

The relationship between voltage and elongation is shown in FIG. 3b. Here, a voltage is shown with a solid line, while a resulting elongation of the arrangement of FIG. 3a is shown with a dashed line. It is apparent, that both parameters are substantially proportional. This also means, that a bump 29 formed with the flow influencing section 14 can be modulated by the voltage applied to the layers 22 and 26.

Figure 4A:
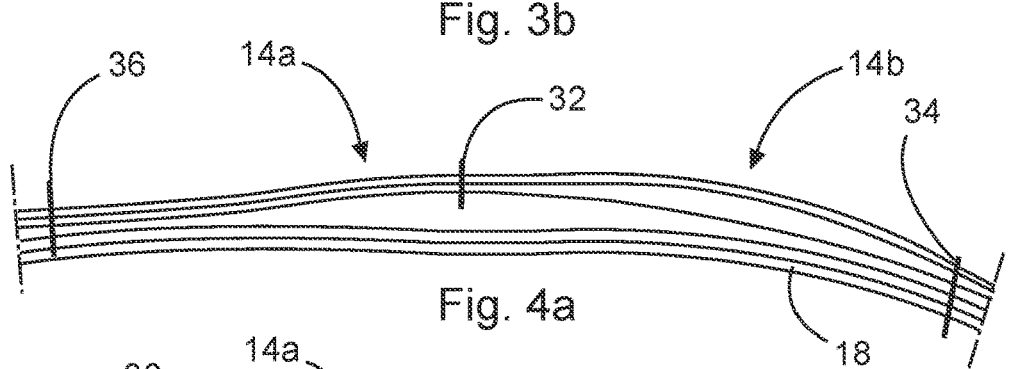
FIGS. 4a and 4b show two flow influencing section overlapping each other.
Figure 4B:
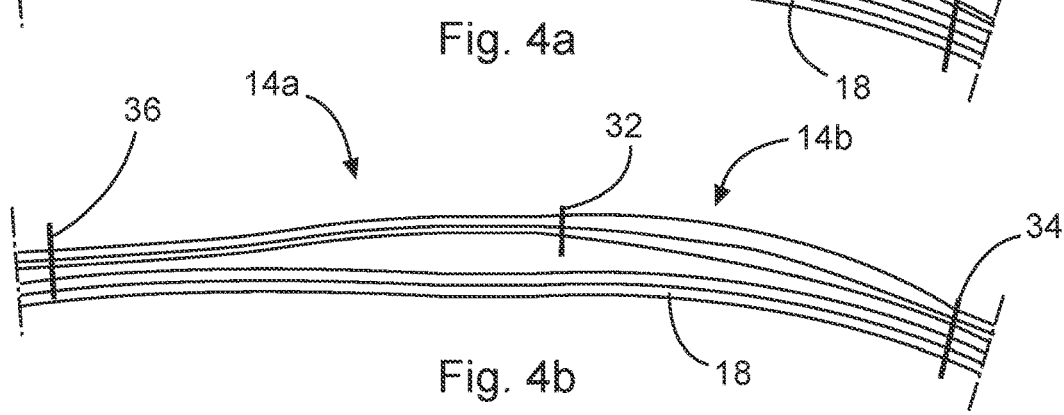

In FIGS. 4a and 4b, a further exemplary embodiment is shown, where two flow influencing sections 14a and 14b are provided on the base layers 18. They overlap each other partially, such that the flow influencing section 14b is arranged on top of the flow influencing section 14a. Consequently, the shape of the bump 29 along the x-direction can be modulated.

It is apparent, that the upper flow influencing section 14b is fixed to the lower flow influencing section 14a along opposed edges 32 and 34. The lower flow influencing section 14a in turn fixed to the base layers 18 with a fixation along opposed edges 36 and 34. These may resemble a stitching line through a laminate created by the layers 18, 22, 24 and 26, said stitching lines clearly geometrically delimiting the individual flow influencing sections 14a and 14b and prevent a peeling off from the base layers 18. Both flow influencing sections 14a and 14b can individually be coupled with the voltage source 28, such that the size of each of them can be modulated individually. This may be conducted by the control system 25 shown in FIG. 2.

Figure 5A:
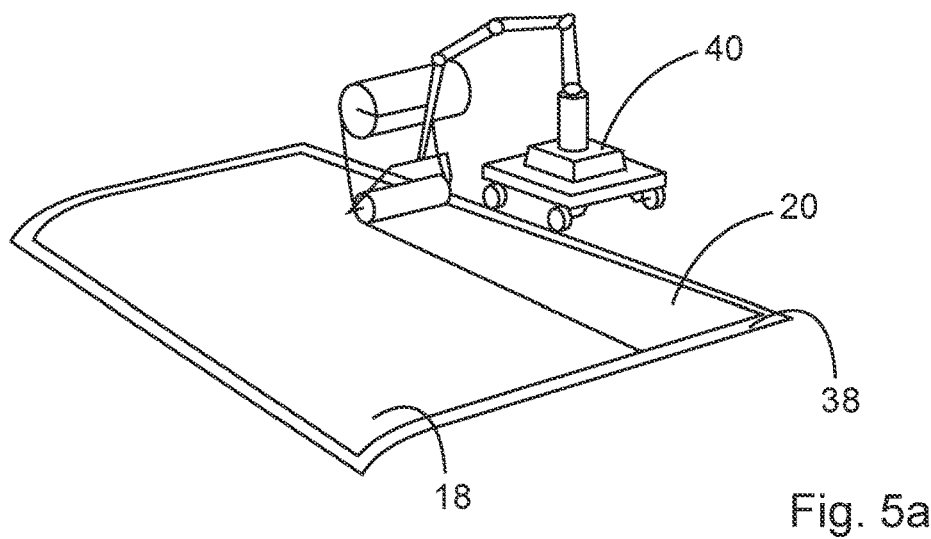
FIGS. 5a to 5c show aspects of a manufacturing method.
Figure 5B:
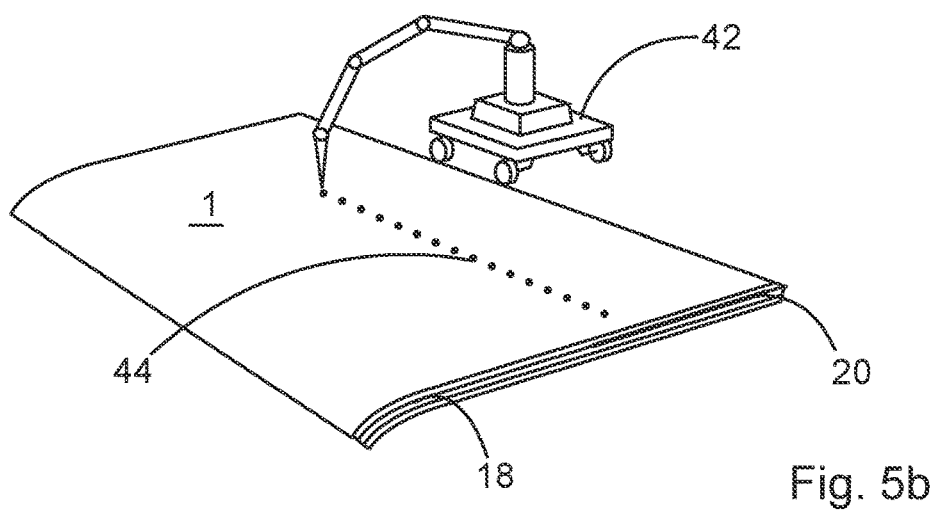
Figure 5C:
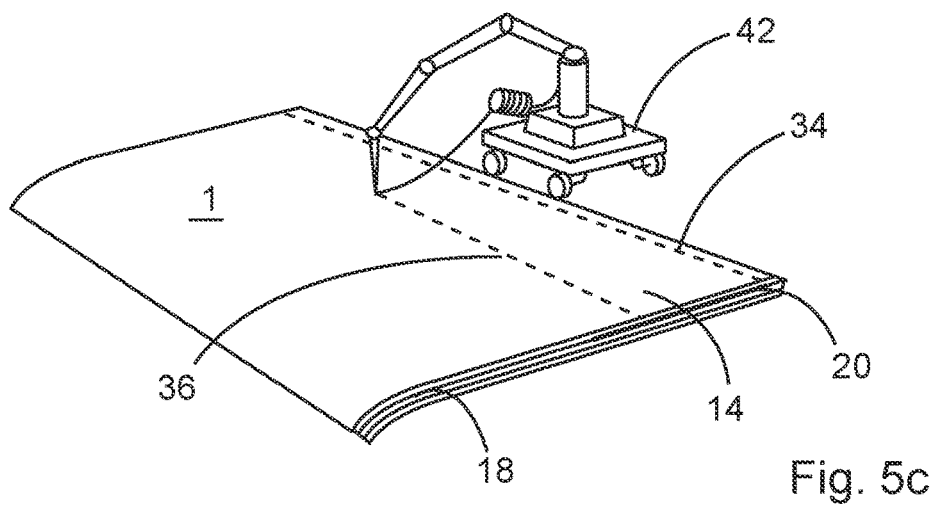

FIGS. 5a, 5b and 5c exemplarily show aspects of a method for manufacturing the flow body 16. FIG. 5a shows a number of base layers 18 on a molding tool 38. Here, a placement tool 40 places a friction reducing coaching twins he to the base layers 18.

In FIG. 5b, the arrangement of first layer 22, separator layer 24 and the third layer 26 is arranged on the base layers 18. A stitching device 42 prepares holes 44 through the laminate. FIG. 5c shows a sewing process by the stitching device 42. Here, exemplarily fixations 34 and 36 are provided, which delimit the extension of the flow influencing section 14.

Figure 6:
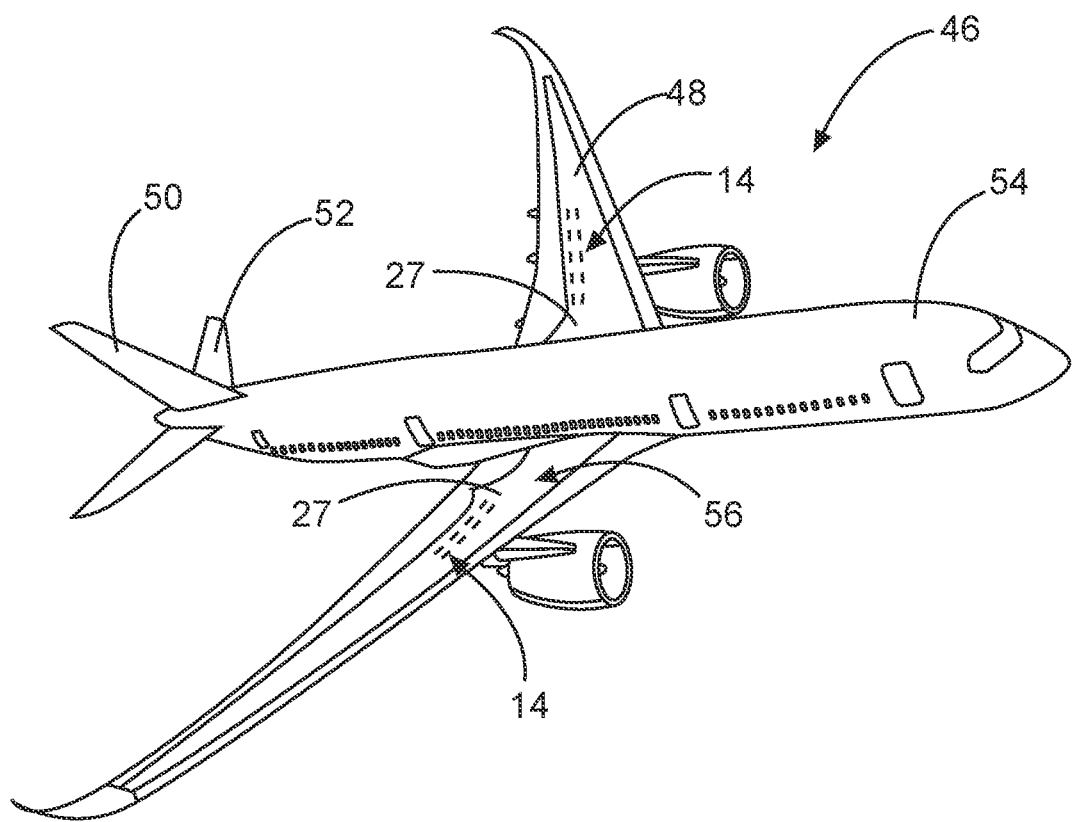
FIG. 6 shows an aircraft having a flow body with a flow influencing section.

FIG. 6 shows an aircraft 46 having wings 48, a vertical tailplane 50, horizontal tailplanes 52 and a fuselage 54. Exemplarily, the wings 48, as a flow body, each comprise a flow influencing section 14 indicated with a dashed line on a first flow surface 56. The first flow surface 56 in this case is a top surface of the respective wing 48 at least partially created by the outer skin 27.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

REFERENCE NUMERALS 2 wing (prior art)
4 leading edge
6 trailing edge
8 top surface
10 bottom surface
12 bump
14 flow influencing section (also: 14a, 14b)
16 flow body
18 base layer
20 friction reducing
22 first layer
24 separator layer (second layer)
25 control system
26 third layer
27 outer skin
28 voltage source
29 bump
30 reinforcement fiber
32 edge
34 edge
36 edge
38 molding tool
40 placement tool
42 stitching device
44 hole
46 aircraft
48 wing
50 a vertical tailplane
52 horizontal tailplane
54 fuselage
56 first flow surface

The invention claimed is:

1. A flow body for an aircraft, the flow body comprising an outer skin having a first flow surface, wherein the skin comprises at least one flow influencing section on the first flow surface, the flow influencing section comprising:
   at least one first layer comprising a first fiber composite material;
   at least one separator layer;
   at least one third layer comprising a second fiber composite material; and
   at least one base layer comprising a third fiber composite material,
   wherein the at least one first layer, the at least one separator layer and the at least one third layer are arranged upon the at least one base layer in an alternating order,
   wherein the at least one first layer comprises lithiated carbon fibers embedded into a matrix to form a negative electrode,
   wherein the at least one third layer comprises carbon fibers with an electrode active material coating to form a positive electrode,
   wherein the at least one separator layer comprises a non-conductive material for electrically isolating the at least one first layer and the at least one third layer from each other, and
   wherein the flow influencing section is configured for selectively raising at least a region of the arrangement of first layer, separator layer and third layer from the at least one base layer upon application of a voltage between the first layer and third layer to form a bump on the flow body.

2. The flow body of claim 1,
   wherein the flow influencing section has a fixed position on the flow body and is configured to expand upon application of the voltage, such that the flow influencing section buckles away from the at least one base layer.

3. The flow body of claim 1,
   wherein the separator layer comprises a glass fiber reinforced plastics material.

4. The flow body of claim 1,
   wherein the separator layer comprises carbon fibers having an electrically isolating coating.

5. The flow body of claim 1,
   wherein the electrode active material coating comprises $LiFePO_4$.

6. The flow body of claim 1,
wherein at least two edges of the flow influencing section that are opposed along an extension direction are fixated to the base layer.

7. The flow body of claim 6,
wherein along the at least two edges, the first, separator and third layers are sewn or stitched to layers underneath before a curing process.

8. The flow body of claim 1,
wherein the first, separator and third layers of the respective flow influencing section are separated from material layers underneath through a friction reducing coating or layer.

9. The flow body of claim 1,
wherein the at least one flow influencing section includes at least two flow influencing sections, which at least partially overlap and which are individually and selectively actuatable to morph the bump from a neutral state to a plurality of different shapes.

10. An aircraft having at least one flow body according to claim 1.

11. The aircraft of claim 10, wherein the flow body is at least one of a group of flow bodies, the group comprising:
a wing,
a vertical tailplane,
a horizontal tailplane,
at least a part of a blended wing body,
a fuselage, and
a fairing.

12. The aircraft of claim 10, further comprising a control system and a voltage source coupled with the control system, wherein the at least one first layer and the at least one third layer are selectively couplable with the voltage source through the control system.

13. The aircraft of claim 12, wherein the aircraft comprises a velocity sensor, and wherein the control system is coupled with the velocity sensor to selectively apply a voltage to the at least one first layer and the at least one third layer upon reaching or exceeding at least one threshold velocity.

14. A method for producing a flow body for an aircraft, the method comprising:
laying at least one base layer onto a surface of a molding tool;
creating a flow influencing section on the at least one base layer by laying at least one first layer comprising a first fiber composite material onto the base layer, laying at least one separator layer onto the first layer, laying at least one third layer comprising a second fiber composite material onto the separator layer, and fixing the first layer, the separator layer and the third layer onto the base layer,
impregnating the arrangement of layers with a matrix material, and
curing or hardening and removing the flow body from the molding tool,
wherein the at least one first layer comprises lithiated carbon fibers embedded into a matrix to form a negative electrode,
wherein the at least one third layer comprises carbon fibers with an electrode active material coating to form a positive electrode, and
wherein the at least one separator layer comprises a non-conductive material for electrically isolating the at least one first layer and the at least one third layer from each other.

15. The method according to claim 14, wherein the fixing is conducted by stitching or sewing.

* * * * *